US012703818B2

(12) United States Patent
Kataishi

(10) Patent No.: US 12,703,818 B2
(45) Date of Patent: Aug. 11, 2026

(54) THERMALLY CONDUCTIVE SILICONE GREASE COMPOSITION AND METHOD FOR PRODUCING THE SAME

(71) Applicant: Fuji Polymer Industries Co., Ltd., Nagoya (JP)

(72) Inventor: Takumi Kataishi, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 912 days.

(21) Appl. No.: 17/802,401

(22) PCT Filed: Sep. 7, 2021

(86) PCT No.: PCT/JP2021/032886
§ 371 (c)(1),
(2) Date: Aug. 25, 2022

(87) PCT Pub. No.: WO2022/158029
PCT Pub. Date: Jul. 28, 2022

(65) Prior Publication Data

US 2023/0106881 A1 Apr. 6, 2023

(30) Foreign Application Priority Data

Jan. 25, 2021 (JP) ................................ 2021-009373

(51) Int. Cl.
*C09K 5/14* (2006.01)
*C08K 13/06* (2006.01)
*C08K 3/38* (2006.01)
*C08K 7/00* (2006.01)
*C08K 9/06* (2006.01)

(52) U.S. Cl.
CPC ................ *C09K 5/14* (2013.01); *C08K 13/06* (2013.01); *C08K 2003/385* (2013.01); *C08K 7/00* (2013.01); *C08K 9/06* (2013.01); *C08K 2201/001* (2013.01); *C08K 2201/005* (2013.01)

(58) Field of Classification Search
CPC ...... C08K 7/00; C08K 9/06; C08K 2003/385; C08K 2201/001; C08K 2201/005; C09K 5/14
See application file for complete search history.

(56) References Cited

U.S. PATENT DOCUMENTS

| | | | | |
|---|---|---|---|---|
| 11,236,203 | B2 * | 2/2022 | Akiba | C08G 77/12 |
| 11,912,869 | B2 * | 2/2024 | Kitazawa | C08K 3/22 |
| 12,570,854 | B2 * | 3/2026 | Hosoda | C08L 83/04 |
| 2006/0100336 | A1 | 5/2006 | Fukui | |
| 2017/0081578 | A1 * | 3/2017 | Kato | C08K 3/28 |
| 2019/0092993 | A1 | 3/2019 | Naik et al. | |
| 2020/0157350 | A1 * | 5/2020 | Sakamoto | C08K 3/22 |
| 2021/0147738 | A1 | 5/2021 | Takanashi et al. | |
| 2021/0269643 | A1 | 9/2021 | Zheng et al. | |

FOREIGN PATENT DOCUMENTS

| | | |
|---|---|---|
| JP | 2004-161797 | 6/2004 |
| JP | 2008-510878 | 4/2008 |
| JP | 2016-011358 | 1/2016 |
| JP | 2016-044213 | 4/2016 |
| JP | 2017-190389 | 10/2017 |
| JP | 2018-104714 | 7/2018 |
| JP | 2020-535270 | 12/2020 |
| WO | 2006/023860 | 3/2006 |
| WO | 2018/088416 | 5/2018 |
| WO | 2019/182854 | 9/2019 |
| WO | 2020/000228 | 1/2020 |

OTHER PUBLICATIONS

International Search Report issued in International Application No. PCT/JP2021/032886, Nov. 30, 2021, 6 pages w/translation.
Extended European Search Report issued in European Patent Application No. 21921134.9, Jul. 7, 2020, 8 pages.

* cited by examiner

*Primary Examiner* — Jane L Stanley
(74) *Attorney, Agent, or Firm* — HSML P.C.

(57) ABSTRACT

A non-curable thermally conductive silicone grease composition includes: A. 100 parts by mass of a non-curable silicone oil with a kinematic viscosity of 50 to 10000 $mm^2/s$ at 40° C.; and B. 105 to 500 parts by mass of thermally conductive particles with respect to 100 parts by mass of the component A. The thermally conductive particles contain the following: B1. 50 to 300 parts by mass of irregularly-shaped alumina with a median particle size of 0.1 to 1 μm, in which a part or all of the alumina is surface treated; B2. 5 to 50 parts by mass of plate-like boron nitride with a median particle size of 0.1 to 10 μm; and B3. 50 to 150 parts by mass of aggregated boron nitride with a median particle size of 20 to 70 μm. The B3/B2 blending ratio is 2 to 20. Thus, the thermally conductive silicone grease composition has a high thermal conductivity, but still has a relatively low specific gravity, and also has a viscosity for good workability and good coating properties.

8 Claims, 1 Drawing Sheet

THERMALLY CONDUCTIVE SILICONE GREASE COMPOSITION AND METHOD FOR PRODUCING THE SAME

TECHNICAL FIELD

The present invention relates to a thermally conductive silicone grease composition that is suitable to be interposed between a heat generating member and a heat dissipating material of electrical and electronic components or the like, and a method for producing the thermally conductive silicone grease composition.

BACKGROUND ART

With the significant improvement in performance of semiconductor devices such as CPUs in recent years, the amount of heat generated by them has become extremely large. For this reason, heat dissipating materials are attached to electronic components that may generate heat, and a thermally conductive silicone grease is used to improve the adhesion between the heat dissipating materials and heat generating members such as semiconductor devices. The thermally conductive silicone grease has been required to have high thermal conductive properties and drop resistance as devices become smaller in size, more sophisticated, and more highly integrated. Patent Document 1 proposes a composition that includes a thermally conductive filler, a polyorganosiloxane resin containing at least one polysiloxane having one curable functional group in the molecule, and a siloxane compound having an alkoxysilyl group and a linear siloxane structure. Patent Document 2 proposes a thermally conductive silicone composition that includes a liquid silicone, a thermally conductive filler, and hydrophobic spherical silica fine particles, and that has high heat dissipation properties. Patent Document 3 proposes a fluorine-containing adhesive composition that includes alumina with different particle sizes and shapes (see paragraph [0131]).

PRIOR ART DOCUMENTS

Patent Documents

Patent Document 1: JP 2018-104714 A
Patent Document 2: JP 2016-044213 A
Patent Document 3: JP 2017-190389 A

DISCLOSURE OF INVENTION

Problem to be Solved by the Invention

However, the viscosity or specific gravity of the conventional thermally conductive silicone grease increases in proportion to the thermal conductivity.

To solve the above conventional problems, the present invention provides a thermally conductive silicone grease composition that has a high thermal conductivity, but still has a relatively low specific gravity, and that also has a viscosity for good workability and good coating properties. Moreover, the present invention provides a method for producing the thermally conductive silicone grease composition.

Means for Solving Problem

A thermally conductive silicone grease composition of the present invention is a non-curable thermally conductive silicone grease composition and includes: A. 100 parts by mass of a non-curable silicone oil with a kinematic viscosity of 50 to 10000 mm$^2$/s at 40° C.; and B. 105 to 500 parts by mass of thermally conductive particles with respect to 100 parts by mass of the component A. The thermally conductive particles contain the following: B1. 50 to 300 parts by mass of irregularly-shaped alumina with a median particle size of 0.1 to 1 μm, in which a part or all of the alumina is surface treated with an alkoxysilane compound expressed by $R_aSi(OR')_{4-a}$ (where R represents a substituted or unsubstituted alkyl group having 8 to 12 carbon atoms, R' represents an alkyl group having 1 to 4 carbon atoms, and a represents 0 or 1) or a partial hydrolysate of the alkoxysilane compound; B2. 5 to 50 parts by mass of plate like boron nitride with a median particle size of 0.1 to 10 μm; and B3. 50 to 150 parts by mass of aggregated boron nitride with a median particle size of 20 to 70 μm. A blending ratio of the component B3 to the component B2 is 2 to 20.

A method for producing a thermally conductive silicone grease composition of the present invention includes mixing 105 to 500 parts by mass of thermally conductive particles (B) with 100 parts by mass of a non-curable silicone oil (A) with a kinematic viscosity of 50 to 10000 mm$^2$/s at 40° C. The thermally conductive particles contain the following: B1. 50 to 300 parts by mass of irregularly-shaped alumina with a median particle size of 0.1 to 1 μm, in which a part or all of the alumina is surface treated with an alkoxysilane compound expressed by $R_aSi(OR')_{4-a}$ (where R represents a substituted or unsubstituted alkyl group having 8 to 12 carbon atoms, R' represents an alkyl group having 1 to 4 carbon atoms, and a represents 0 or 1) or a partial hydrolysate of the alkoxysilane compound; B2. 5 to 50 parts by mass of plate-like boron nitride with a median particle size of 0.1 to 10 μm; and B3. 50 to 150 parts by mass of aggregated boron nitride with a median particle size of 20 to 70 μm. A blending ratio of the component B3 to the component B2 is 2 to 20.

Effects of the Invention

In the present invention, the irregularly-shaped alumina, the plate-like boron nitride, and the aggregated boron nitride, each of which has a specific particle size, are combined and mixed together, thus providing the thermally conductive silicone grease composition that can have a high thermal conductivity, but still have a relatively low specific gravity, and that can also have a viscosity for good workability and good coating properties. Moreover, the thermally conductive silicone grease composition is non-curable and does not cause any change in the properties during storage and after use, resulting in better storage stability.

DESCRIPTION OF THE INVENTION

Figure 1A:
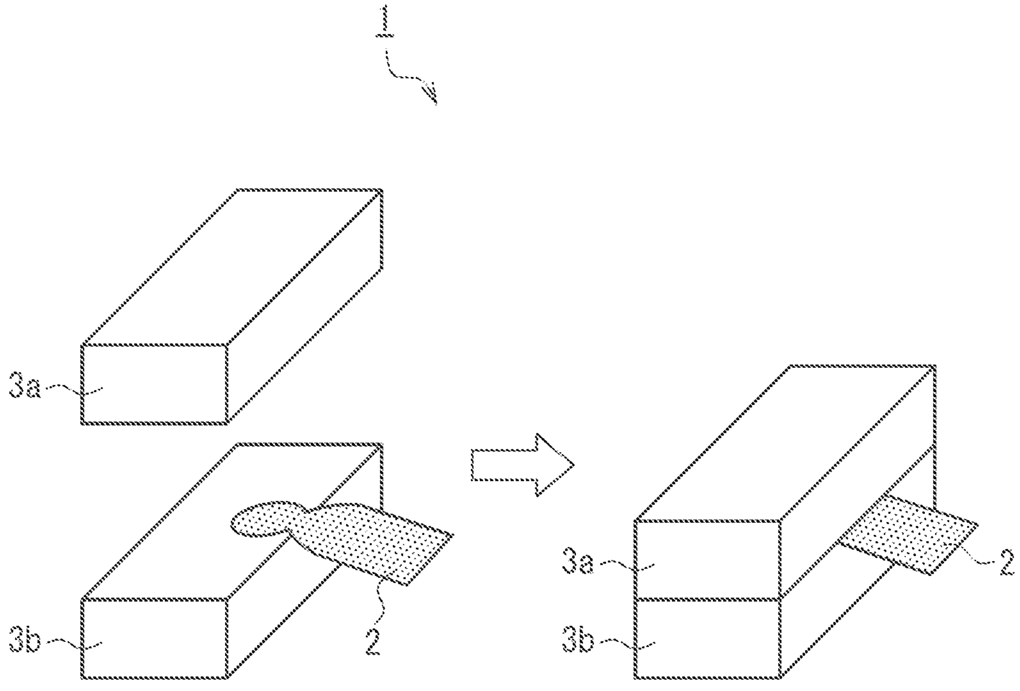
FIGS. 1A to 1B are diagrams illustrating a method for measuring a thermal conductivity of a sample in an example of the present invention.

The thermally conductive silicone grease composition of the present invention is a non-curable thermally conductive silicone grease composition. Therefore, a curing catalyst and a curing agent are not necessary, but may be added in some cases. The non-curable silicone oil is used as a matrix resin. The silicone oil and the thermally conductive particles are basic components and are mixed in the following proportions. The component A and the component B, and optionally other components, are mixed to form a grease.

A. 100 parts by mass of the non-curable silicone oil with a kinematic viscosity of 50 to 10000 $mm^2/s$ at 40° C.

B. 105 to 500 parts by mass of the thermally conductive particles with respect to 100 parts by mass of the component A The kinematic viscosity of the component A is preferably 50 to 9000 $mm^2/s$, more preferably 50 to 8000 $mm^2/s$, and further preferably 50 to 7000 $mm^2/s$ at 40° C.

The amount of the component B is preferably 110 to 500 parts by mass, and more preferably 120 to 500 parts by mass with respect to 100 parts by mass of the component A.

The thermally conductive particles contain the following:

B1. 50 to 300 parts by mass of irregularly shaped alumina with a median particle size of 0.1 to 1 μm, in which a part or all of the alumina is surface treated with an alkoxysilane compound expressed by $R_aSi(OR')_{4-a}$ (where R represents a substituted or unsubstituted alkyl group having 8 to 12 carbon atoms, R' represents an alkyl group having 1 to 4 carbon atoms, and a represents 0 or 1) or a partial hydrolysate of the alkoxysilane compound;

B2. 5 to 50 parts by mass of plate-like boron nitride with a median particle size of 0.1 to 10 μm; and B3. 50 to 150 parts by mass of aggregated boron nitride with a median particle size of 20 to 70 μm.

The blending ratio of the component B3 to the component B2 is 2 to 20.

In this case, the term "part" of the alumina means 50% by mass or more.

The amount of the component B1 is preferably 60 to 300 parts by mass, and more preferably 70 to 280 parts by mass with respect to 100 parts by mass of the component A.

The amount of the component B2 is preferably 7 to 45 parts by mass, and more preferably 10 to 40 parts by mass with respect to 100 parts by mass of the component A.

The amount of the component B3 is preferably 55 to 150 parts by mass, and more preferably 60 to 150 parts by mass with respect to 100 parts by mass of the component A.

The blending ratio of the component B3 to the component B2 (B3/B2) is preferably 2.5 to 20, and more preferably 3 to 20. With this configuration, small size particles are present between large-size particles, which can approximate the closest packing and improve the thermal conductive properties.

The thermally conductive silicone grease composition preferably further includes 0.1 to 2 parts by mass of an alkoxysilane compound expressed by $R_aSi(OR')_{4-a}$ (where R represents a substituted or unsubstituted alkyl group having 8 to 12 carbon atoms, R' represents an alkyl group having 1 to 4 carbon atoms, and a represents 0 or 1) as a component C. This can reduce the viscosity of the composition.

The thermal conductivity of the thermally conductive silicone grease composition is preferably 2.0 W/m K or more and 8.0 W/m·K or less, more preferably 2.5 to 8.0 W/m·K, and further preferably 3.0 to 8.0 W/m·K. This thermally conductive grease is suitable as a TIM (thermal interface material).

The specific gravity of the thermally conductive silicone grease composition is preferably 1.0 or more and 2.0 or less, more preferably 1.0 to 1.9, and further preferably 1.0 to 1.8. Thus, the silicone grease with a lower specific gravity is obtained, which can reduce the weight of the entire electronic components.

The absolute viscosity of the thermally conductive silicone grease composition is preferably 1000 to 10000 Pas, more preferably 1000 to 8000 Pas, and further preferably 1000 to 7000 Pas at 23° C., which is measured with a B-type viscometer using a T-E spindle at a rotational speed of 5 rpm. This can improve the workability of the thermally conductive silicone grease composition, and can also facilitate the insertion or application of the thermally conductive silicone grease composition between the heat generating member and the heat dissipating material. Moreover, the thermally conductive silicone grease composition is non-curable and does not cause any change in the properties during storage and after use, resulting in better storage stability.

In the present invention, the reason that the components B1, B2, and B3 are mixed with the component A in the above proportions is to allow small-size particles to fill the space between large-size particles so that the closest packing can be approximated to enhance the thermal conductive properties. The particle size may be measured with a laser diffraction scattering method to determine D50 (median diameter) in a volume-based cumulative particle size distribution. The method may use, e.g., a laser diffraction/scattering particle size distribution analyzer LA-950 S2 manufactured by HORIBA, Ltd.

A part or all of the irregularly-shaped alumina with a median particle size of 0.1 to 1 μm (component B1) is surface treated with an alkoxysilane compound expressed by $R_aSi(OR')_{4-a}$ (where R represents a substituted or unsubstituted alkyl group having 8 to 12 carbon atoms, R' represents an alkyl group having 1 to 4 carbon atoms, and a represents 0 or 1) or a partial hydrolysate of the alkoxysilane compound. Examples of the alkoxysilane compound include octyltrimethoxysilane, octyltriethoxysilane, decyltrimethoxysilane, decyltriethoxysilane, dodecyltrimethoxysilane, and dodecyltriethoxysilane. In particular, the carbon number of the alkyl group represented by R is within a preferred range of 8 to 12, and the alkoxysilane compound is in a liquid state and has water repellency and a high affinity for the silicone oil. These silane compounds may be used alone or in combination of two or more. The alkoxysilane and one-end silanol siloxane may be used together as a surface treatment agent. In this case, the surface treatment may include adsorption in addition to a covalent bond.

The irregularly-shaped alumina with a median particle size of 0.1 to 1 μm (component B1) cannot be easily mixed with the silicone oil if it is not subjected to any treatment. However, the irregularly shaped alumina that has been pretreated, i.e., surface treated with the alkoxysilane compound is easily mixed with the silicone oil, so that a uniform composition can be obtained. It is preferable that 0.01 to 10 parts by mass of the alkoxysilane compound is added to 100 parts by mass of the irregularly shaped alumina with a median particle size of 0.1 to 1 μm. In this case, the pretreatment means that the thermally conductive particles are surface treated with the surface treatment agent in advance before mixing the thermally conductive particles and the silicone oil.

The thermally conductive particles other than the component B1 may be either pretreated or not pretreated, since the mixability will not be reduced even if the pretreatment is not performed.

The grease of the present invention may include components other than the above as needed. For example, a heat resistance improver (such as colcothar, titanium oxide, or cerium oxide), a flame retardant, and a flame retardant auxiliary may be added. Moreover, an organic or inorganic particle pigment may be added for the purpose of coloring and toning. An alkoxy group-containing silicone may be added as a material, e.g., for the surface treatment of a filler.

The thermally conductive silicone grease composition of the present invention may be put into, e.g., a dispenser, a bottle, a can, or a tube and offered as a commercial product.

A method for producing a thermally conductive silicone grease composition of the present invention includes mixing 105 to 500 parts by mass of thermally conductive particles (B) with 100 parts by mass of a non-curable silicone oil (A) with a kinematic viscosity of 50 to 10000 mm$^2$/s at 40° C. The thermally conductive particles contain the following: B1. 50 to 300 parts by mass of irregularly-shaped alumina with a median particle size of 0.1 to 1 μm, in which a part or all of the alumina is surface treated with an alkoxysilane compound expressed by $R_aSi(OR')_{4-a}$ (where R represents a substituted or unsubstituted alkyl group having 8 to 12 carbon atoms, R' represents an alkyl group having 1 to 4 carbon atoms, and a represents 0 or 1) or a partial hydrolysate of the alkoxysilane compound; B2. 5 to 50 parts by mass of plate-like boron nitride with a median particle size of 0.1 to 10 μm; and B3. 50 to 150 parts by mass of aggregated boron nitride with a median particle size of 20 to 70 μm.

The blending ratio of the component B3 to the component B2 is 2 to 20.

The above material components may be mixed, e.g., in a planetary mixer. If the mixture is too viscous to be uniformly dispersed with the planetary mixer, it is preferable that the mixture is further kneaded using two rolls. The planetary mixer has two blades that make a planetary motion, in which each blade revolves as it rotates on its axis.

EXAMPLES

Hereinafter, the present invention will be described by way of examples. However, the present invention is not limited to the following examples. Various parameters were measured in the following manner.

<Thermal Conductivity>

Figure 1B:
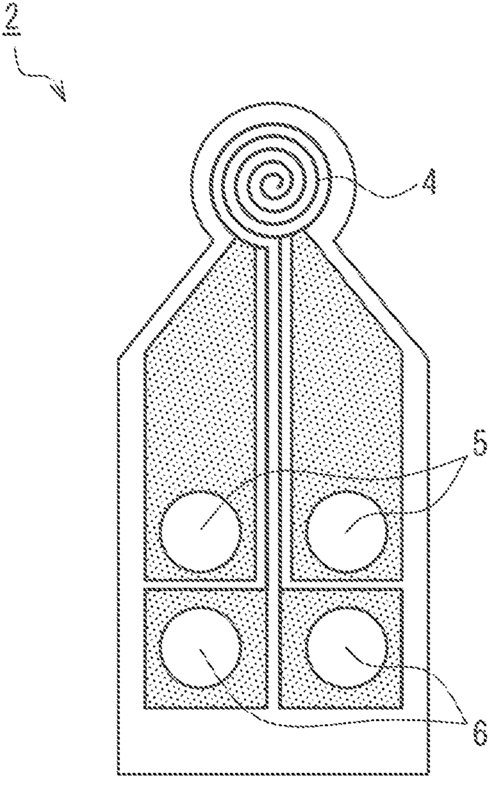

The thermal conductivity of a thermally conductive grease was measured by a hot disk (in accordance with ISO/CD 22007-2). As shown in FIG. 1A, using a thermal conductivity measuring apparatus 1, a polyimide film sensor 2 was sandwiched between two samples 3*a*, 3*b*, and constant power was applied to the sensor 2 to generate a certain amount of heat. Then, the thermal characteristics were analyzed from the value of a temperature rise of the sensor 2. The sensor 2 has a tip 4 with a diameter of 7 mm. As shown in FIG. 1B, the tip 4 has a double spiral structure of electrodes. Moreover, an electrode 5 for an applied current and an electrode 6 for a resistance value (temperature measurement electrode) are located on the lower portion of the sensor 2. The thermal conductivity was calculated by the following formula (1).

$$\lambda = \frac{P_0 \cdot D(\tau)}{\pi^{3/2} \cdot r} \cdot \frac{D(\tau)}{\Delta T(\tau)} \quad \text{[Formula 1]}$$

λ: Thermal conductivity (W/m·K)

$P_0$: Constant power (W)

r: Radius of sensor (m)

τ: $\sqrt{\alpha \cdot t / r^2}$

α: Thermal diffusivity of sample (m$^2$/s)

t: Measuring time(s)

D(τ): Dimensionless function of t

ΔT(τ): Temperature rise of sensor (K)

<Absolute Viscosity of Grease>

The absolute viscosity of the grease was measured with a B-type viscometer (Brookfield HB DV2T). The B-type viscometer used a T-E spindle to measure the absolute viscosity at a rotational speed of 5 rpm and 23° C.

Examples 1 to 2 and Comparative Examples 1 to 2

1. Material Components (1) Component A: Silicone Oil

A non-curable silicone oil (dimethylpolysiloxane) with a kinematic viscosity of 110 mm$^2$/s at 40° C. was used in the proportions as shown in Table 1.

(2) Component B: Thermally Conductive Particles

- Irregularly-shaped alumina with a median particle size of 0.3 μm (D50=0.3 μm): a material pretreated with octyltrimethoxysilane (in which 2.4 g of octyltrimethoxysilane was adsorbed on 100 g of alumina.)
- Plate-like boron nitride with a median particle size of 1 μm (D50=1 μm)
- Plate-like boron nitride with a median particle size of 5 μm (D50=5 μm)
- Aggregated spherical boron nitride with a median particle size of 60 μm (D50=60 μm)
- Irregularly-shaped alumina with a median particle size of 2.3 μm (D50=2.3 μm): a material pretreated with decyltrimethoxysilane (in which 1.1 g of decyltrimethoxysilane was adsorbed on 100 g of alumina.)
- Spherical alumina with a median particle size of 20 μm (D50=20 μm) Table 1 shows the amount of each type of the thermally conductive particles added.

(3) Component C: Alkoxysilane Compound

Decyltrimethoxysilane was added in the amount as shown in Table 1.

2. Mixing Method

The silicone oil and the thermally conductive particles were placed in a planetary mixer and mixed together at 23° C. for 10 minutes to form a thermally conductive silicone grease composition.

The grease thus obtained was evaluated. Table 1 shows the conditions and results.

TABLE 1

| Component | | Ex. 1 | Ex. 2 | Comp. Ex. 1 | Comp. Ex. 2 |
|---|---|---|---|---|---|
| A | Silicone oil, kinematic viscosity: 110 mm$^2$/s (g) | 100 | 100 | 100 | 100 |
| B1 | Irregularly shaped alumina, D50 = 0.3 μm, | 170 | 180 | 50 | 170 |

TABLE 1-continued

| Component | | Ex. 1 | Ex. 2 | Comp. Ex. 1 | Comp. Ex. 2 |
|---|---|---|---|---|---|
| | surface-treated material (g) | | | | |
| B2 | Plate-like boron nitride, D50 = 1 μm (g) | 15 | — | — | 45 |
| B2 | Plate-like boron nitride, D50 = 5 μm (g) | — | 20 | — | — |
| B3 | Aggregated spherical boron nitride, D50 = 60 μm (g) | 85 | 85 | — | 85 |
| | Irregularly shaped alumina, D50 = 2.3 μm, surface-treated material (g) | — | — | 650 | — |
| | Spherical alumina, D50 = 20 μm (g) | — | — | 550 | — |
| C | Decyltrimethoxysilane (g) | 0.5 | 0.5 | — | 0.5 |
| B3/B2 blending ratio | | 5.7 | 4.3 | — | 1.9 |
| Absolute viscosity (Pas, B-type viscometer) | | 3800 | 3400 | 3300 | not measurable |
| Thermal conductivity (W/m · K), hot disk method | | 5.1 | 4.9 | 3.1 | 5.6 |
| Specific gravity | | 1.9 | 1.9 | 3.2 | 1.9 |

The results confirmed that the thermally conductive silicone grease compositions of Examples 1 to 2 had a high thermal conductivity, but still had a relatively low specific gravity, and also had a viscosity for good workability. In Comparative Example 1, the specific gravity was high because all the thermally conductive particles were composed of alumina. In Comparative Example 2, the viscosity was high because the B3/B2 blending ratio was outside the range of 2 to 20.

INDUSTRIAL APPLICABILITY

The thermally conductive silicone grease composition of the present invention is suitable to be interposed between a heat generating member and a heat dissipating material of electrical and electronic components or the like.

DESCRIPTION OF REFERENCE NUMERALS

1 Thermal conductivity measuring apparatus
2 Sensor
3*a*, 3*b* Sample
4 Tip of the sensor
5 Electrode for applied current
6 Electrode for resistance value (temperature measurement electrode)

The invention claimed is:

1. A thermally conductive silicone grease composition that is non-curable, comprising:

A. 100 parts by mass of a non-curable silicone oil with a kinematic viscosity of 50 to 10000 $mm^2/s$ at 40° C.; and B. 105 to 500 parts by mass of thermally conductive particles with respect to 100 parts by mass of the component A, wherein the thermally conductive particles contain the following:

B1. 50 to 300 parts by mass of pretreated irregularly-shaped alumina with a median particle size of 0.1 to 1 μm, in which a part or all of the alumina previously was surface treated, before mixing of the irregularly-shaped alumina with the silicone oil, with an alkoxysilane compound expressed by $R_aSi(OR')_{4-a}$, where R represents a substituted or unsubstituted alkyl group having 8 to 12 carbon atoms, R' represents an alkyl group having 1 to 4 carbon atoms, and a represents 0 or 1, or a partial hydrolysate of the alkoxysilane compound;

B2. 5 to 50 parts by mass of plate-like boron nitride with a median particle size of 0.1 to 1 μm; and B3. 50 to 150 parts by mass of aggregated boron nitride with a median particle size of 20 to 70 μm, wherein a blending ratio of the component B3 to the component B2 is 2 to 20, wherein the thermally conductive silicone grease composition has a specific gravity of 1.0 or more and 2.0 or less and a thermal conductivity of 2.0 W/m·K or more and 8.0 W/m·K or less, and an absolute viscosity of 1000 to 7000 Pas at 23° C., as measured with a B-type viscometer using a T-E spindle at a rotational speed of 5 rpm.

2. The thermally conductive silicone grease composition according to claim 1, further comprising 0.1 to 2 parts by mass of an alkoxysilane compound expressed by $R_aSi(OR')_{4-a}$, where R represents a substituted or unsubstituted alkyl group having 8 to 12 carbon atoms, R' represents an alkyl group having 1 to 4 carbon atoms, and a represents 0 or 1, as a component C in addition to the component A and the component B.

3. The thermally conductive silicone grease composition according to claim 1, wherein 0.01 to 10 parts by mass of the alkoxysilane compound was added to 100 parts by mass of the irregularly-shaped alumina of the component B1 before mixing of the irregularly-shaped alumina of the component B1 with the silicone oil.

4. The thermally conductive silicone grease composition according to claim 1, wherein the thermally conductive silicone grease composition is put into at least one selected from the group consisting of a dispenser, a bottle, a can, and a tube.

5. A method for producing a non-curable thermally conductive silicone grease composition, the method comprising:

mixing 105 to 500 parts by mass of thermally conductive particles (B) with 100 parts by mass of a non-curable silicone oil (A) with a kinematic viscosity of 50 to 10000 $mm^2/s$ at 40° C., wherein the thermally conductive particles contain the following:

B1. 50 to 300 parts by mass of pretreated irregularly-shaped alumina with a median particle size of 0.1 to 1 μm, in which a part or all of the alumina previously was surface treated, before mixing of the irregularly-shaped alumina with the silicone oil, with an alkoxysilane compound expressed by $R_aSi(OR')_{4-a}$, where R represents a substituted or unsubstituted alkyl group having 8 to 12 carbon atoms, R' represents an alkyl group having 1 to 4 carbon atoms, and a represents 0 or 1, or a partial hydrolysate of the alkoxysilane compound;

B2. 5 to 50 parts by mass of plate-like boron nitride with a median particle size of 0.1 to 10 μm; and B3. 50 to 150 parts by mass of aggregated boron nitride with a median particle size of 20 to 70 μm, wherein a blending ratio of the component B3 to the component B2 is 2 to 20, wherein the produced thermally conductive silicone grease composition has a specific gravity of 1.0 or more and 2.0 or less and a thermal conductivity of 2.0 W/m·K or more and 8.0 W/m·K or less, and an absolute viscosity of 1000 to 7000 Pas at 23° C., as measured with a B-type viscometer using a T-E spindle at a rotational speed of 5 rpm.

6. The method according to claim 5, wherein the thermally conductive silicone grease composition further comprises 0.1 to 2 parts by mass of an alkoxysilane compound expressed by $R_aSi(OR')_{4-a}$, where R represents a substituted or unsubstituted alkyl group having 8 to 12 carbon atoms, R' represents an alkyl group having 1 to 4 carbon atoms, and a represents 0 or 1, as a component C in addition to the component A and the component B.

7. The method according to claim 5, wherein 0.01 to 10 parts by mass of the alkoxysilane compound was added to 100 parts by mass of the irregularly-shaped alumina of the component B1 before mixing of the irregularly-shaped alumina of the component B1 with the silicone oil.

8. The method according to claim 5, wherein the thermally conductive silicone grease composition is put into at least one selected from the group consisting of a dispenser, a bottle, a can, and a tube.

* * * * *